(12) United States Patent
Schechter et al.

(10) Patent No.: US 7,626,595 B2
(45) Date of Patent: Dec. 1, 2009

(54) RESOLUTION INDEPENDENT IMAGE RESOURCE

(75) Inventors: Greg D. Schechter, Seattle, WA (US); Adam M. Smith, Sammamish, WA (US); Leonardo E. Blanco, Redmond, WA (US); Sriram Subramanian, Kirkland, WA (US); Rajat Goel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/195,209

(22) Filed: Aug. 1, 2005

(65) Prior Publication Data

US 2007/0052732 A1 Mar. 8, 2007

(51) Int. Cl.
*G09G 5/02* (2006.01)
*G09G 5/22* (2006.01)
(52) U.S. Cl. ...................... 345/619; 345/660
(58) Field of Classification Search ................ 345/660, 345/619
See application file for complete search history.

(56) References Cited

U.S. PATENT DOCUMENTS

| | | | | |
|---|---|---|---|---|
| 4,876,651 A | * | 10/1989 | Dawson et al. ............. | 701/200 |
| 5,511,153 A | * | 4/1996 | Azarbayejani et al. ...... | 345/419 |
| 5,715,331 A | * | 2/1998 | Hollinger ................... | 382/199 |
| 5,742,779 A | * | 4/1998 | Steele et al. ................ | 715/839 |
| 5,982,991 A | * | 11/1999 | Smith ........................ | 358/1.9 |
| 6,011,566 A | * | 1/2000 | Salamon ..................... | 345/600 |
| 6,266,053 B1 | * | 7/2001 | French et al. .............. | 715/255 |
| 6,721,769 B1 | * | 4/2004 | Rappaport et al. .......... | 707/205 |
| 7,064,766 B2 | * | 6/2006 | Beda et al. ................. | 345/557 |
| 7,158,878 B2 | * | 1/2007 | Rasmussen et al. ......... | 701/208 |
| 7,206,006 B2 | * | 4/2007 | Nah et al. ................... | 345/698 |
| 7,209,148 B2 | * | 4/2007 | Rasmussen et al. ......... | 345/613 |
| 2001/0048435 A1 | * | 12/2001 | Deering et al. ............. | 345/441 |
| 2003/0231190 A1 | * | 12/2003 | Jawerth et al. ............. | 345/660 |
| 2004/0160458 A1 | * | 8/2004 | Igarashi et al. ............. | 345/660 |
| 2004/0183817 A1 | * | 9/2004 | Kaasila ...................... | 345/660 |
| 2005/0017988 A1 | * | 1/2005 | Ackley et al. .............. | 345/660 |
| 2005/0068340 A1 | * | 3/2005 | Lipsky et al. ............... | 345/661 |
| 2005/0206659 A1 | * | 9/2005 | Cutler ........................ | 345/660 |
| 2005/0243346 A1 | * | 11/2005 | Foehr et al. ................. | 358/1.9 |
| 2005/0270311 A1 | * | 12/2005 | Rasmussen et al. ......... | 345/677 |
| 2005/0273701 A1 | * | 12/2005 | Emerson et al. ............ | 715/513 |
| 2005/0288859 A1 | * | 12/2005 | Golding et al. ............. | 701/211 |
| 2006/0005126 A1 | * | 1/2006 | Shapiro ...................... | 715/522 |
| 2006/0033762 A1 | * | 2/2006 | Card et al. .................. | 345/660 |
| 2006/0187241 A1 | * | 8/2006 | Boler et al. ................. | 345/660 |
| 2007/0096945 A1 | * | 5/2007 | Rasmussen et al. ...... | 340/995.1 |
| 2007/0153028 A1 | * | 7/2007 | Nah et al. ................... | 345/698 |

OTHER PUBLICATIONS

Topology in Raster and Vector Representation by: Stephan Winter, Andrew U Frank Geoinformatica, vol. 4, No. 1. (Mar. 2000), pp. 35-65.*

* cited by examiner

*Primary Examiner*—Javid A Amini
(74) *Attorney, Agent, or Firm*—Workman Nydegger

(57) ABSTRACT

In aspects, a class hierarchy is defined that provides definitions of methods for operating on at least bitmaps and vector graphics. A software developer may instantiate an object according to a class definition of the class hierarchy and assign it to any variable (e.g., a control's property) having a type of an ancestor class of the class. The object may be associated with an image internally represented as bitmap, vector graphics, or some other representation. The control does not need to be aware of how the image is represented. Rather, to draw an image associated with the object, a draw method associated with the object may be called.

20 Claims, 10 Drawing Sheets

RESOLUTION INDEPENDENT IMAGE RESOURCE

BACKGROUND

User interface platforms provide a number of interfaces for referencing and using a bitmap image. These bitmaps are then often contained in user interface elements that let a software developer, for instance, to tile, scale, or stretch them. However, when bitmap-based images are stretched, they become blocky, and of lower quality. Vector graphics, on the other hand, allow scaling that maintains high quality regardless of the degree of scaling. But vector graphics typically aren't represented as an "image", but rather as a series of instructions.

SUMMARY

Briefly, aspects of the subject matter described herein relate to images. In aspects, a class hierarchy is defined that provides definitions of methods for operating on at least bitmaps and vector graphics. A software developer may instantiate an object according to a class definition of the class hierarchy and assign it to any variable (e.g., a control's property) having a type of an ancestor class of the class. The object may be associated with an image internally represented as bitmap, vector graphics, or some other representation. The control does not need to be aware of how the image is represented. Rather, to draw an image associated with the object, a draw method associated with the object may be called.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

Other aspects will become apparent from the following Detailed Description when taken in conjunction with the drawings, in which:

DETAILED DESCRIPTION

Exemplary Operating Environment

Figure 1:
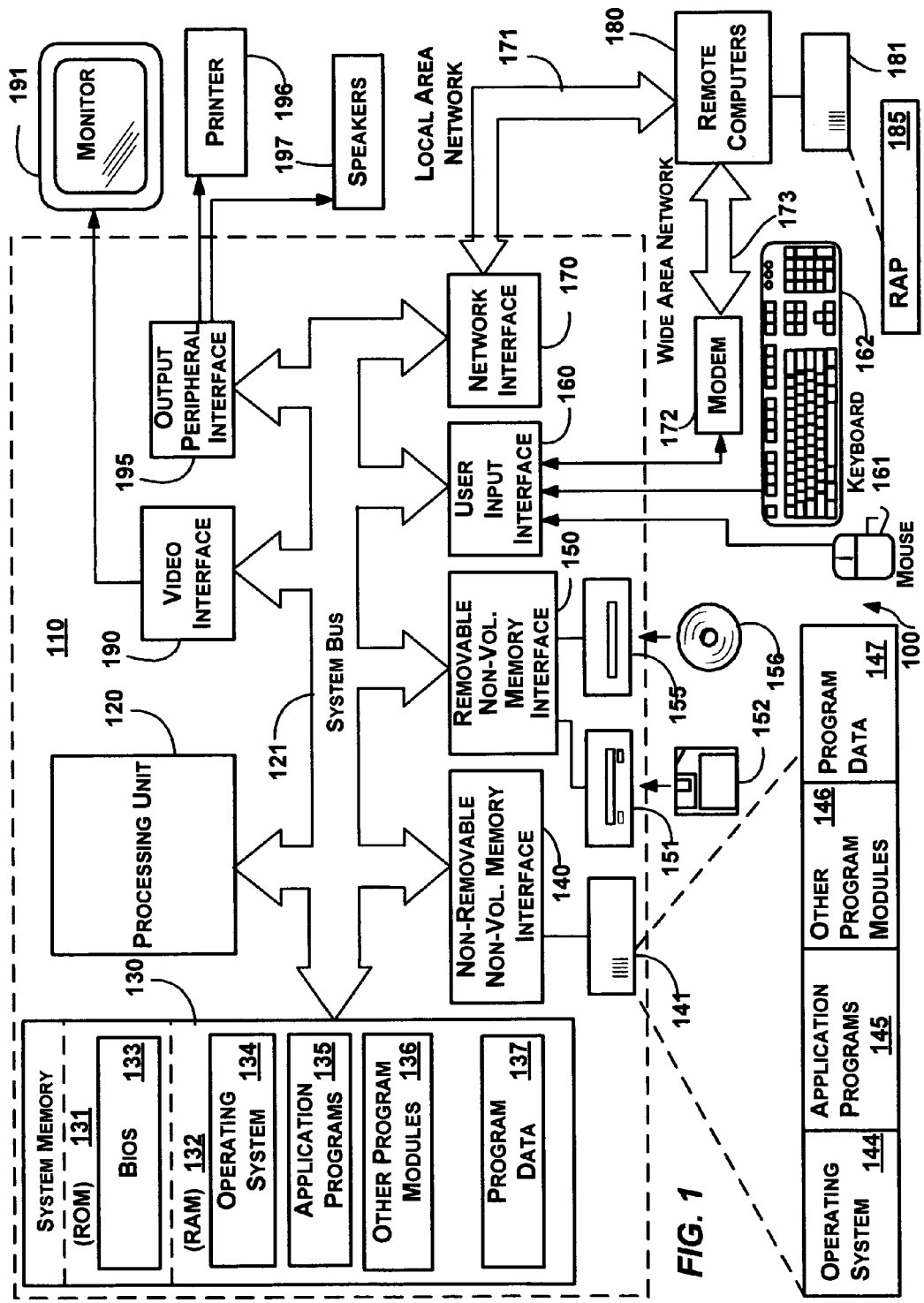
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media or communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other storage medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Interfaces

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), and the like of a component of a system capable of communicative coupling to one or more mechanism(s), method(s), function call(s), module (s), and the like of other component(s). The term "segment of code" is intended to include one or more instructions or lines of code, and includes, for example, code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2A:
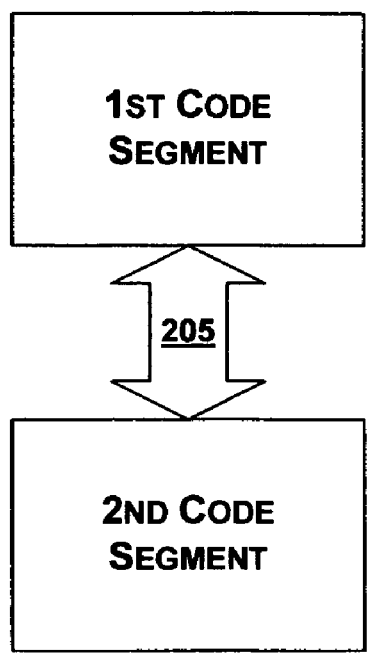
FIGS. 2A-6B are block diagrams generally representing exemplary application programming interfaces that may operate in accordance with aspects of the subject matter described herein.
Figure 2B:
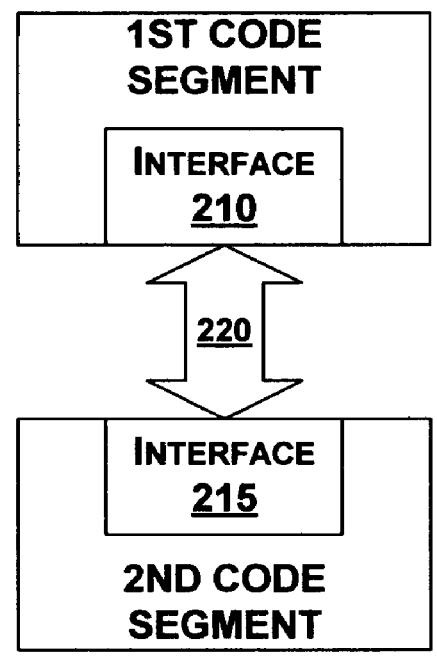

Notionally, a programming interface may be viewed generically, as shown in FIG. 2A or FIG. 2B. FIG. 2A illustrates an interface 205 as a conduit through which first and second code segments communicate. FIG. 2B illustrates an interface as comprising interface objects 210 and 215 (which may or may not be part of the first and second code segments), which enable first and second code segments of a system to communicate via medium 220. In the view of FIG. 2B, one may consider interface objects 210 and 215 as separate interfaces of the same system and one may also consider that objects 210 and 215 plus medium 220 comprise the interface. Although FIGS. 2A and 2B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing, and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or non-existent, as when one code segment simply accesses functionality performed by a second code segment. Any or all of these aspects may be important in a given situation, for example, depending on whether the code segments are part of a system in a loosely coupled or tightly coupled configuration, and so this list should be considered illustrative and non-limiting.

This notion of a programming interface is known to those skilled in the art and is clear from the foregoing detailed description. There are, however, other ways to implement a programming interface, and, unless expressly excluded, these too are intended to be encompassed by the claims set forth at the end of this specification. Such other ways may appear to be more sophisticated or complex than the simplistic view of FIGS. 2A and 2B, but they nonetheless perform a similar function to accomplish the same overall result. Below are some illustrative alternative implementations of a programming interface.

A. Factoring

Figure 3A:
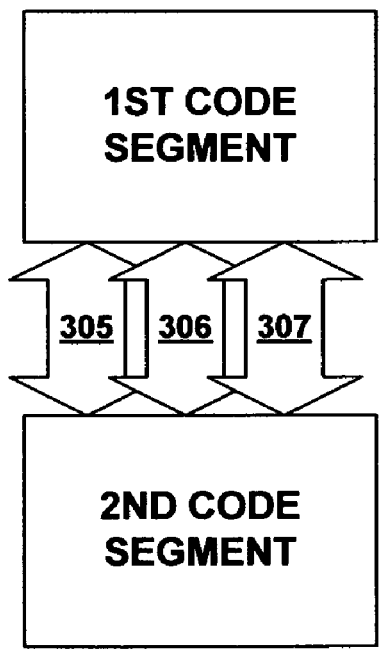

A communication from one code segment to another may be accomplished indirectly by breaking the communication into multiple discrete communications. This is depicted schematically in FIGS. 3A and 3B. As shown, some interfaces can be described in terms of divisible sets of functionality. Thus, the interface functionality of FIGS. 2A and 2B may be factored to achieve the same result, just as one may mathematically provide 24 as 2 times 2 times 3 times 2. Accordingly, as illustrated in FIG. 3A, the function provided by interface 205 may be subdivided to convert the communications of the interface into multiple interfaces 305, 306, 307, and so on while achieving the same result.

Figure 3B:
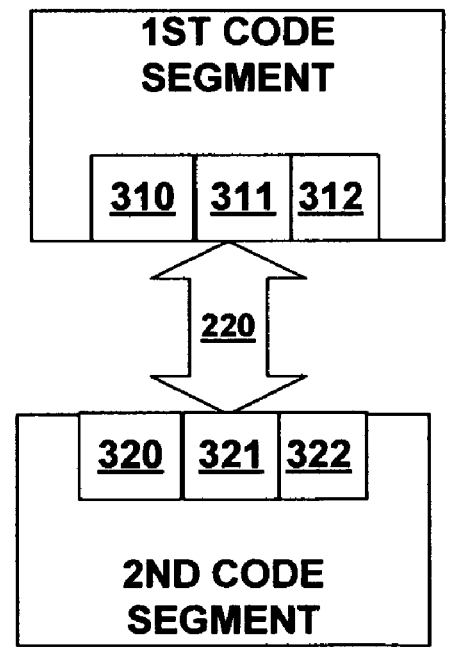

As illustrated in FIG. 3B, the function provided by interface 210 may be subdivided into multiple interfaces 310, 311, 312, and so forth while achieving the same result. Similarly, interface 215 of the second code segment which receives information from the first code segment may be factored into multiple interfaces 320, 321, 322, and so forth. When factoring, the number of interfaces included with the $1^{st}$ code segment need not match the number of interfaces included with the $2^{nd}$ code segment. In either of the cases of FIGS. 3A and 3B, the functional spirit of interfaces 205 and 210 remain the same as with FIGS. 2A and 2B, respectively.

The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 4A:
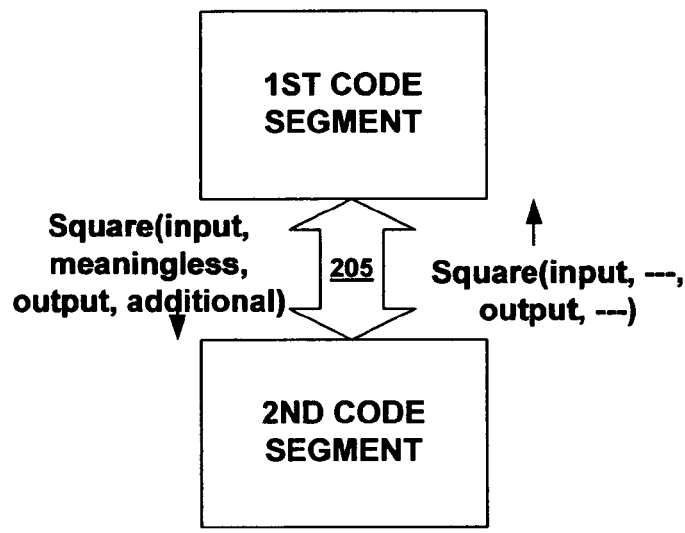
Figure 4B:
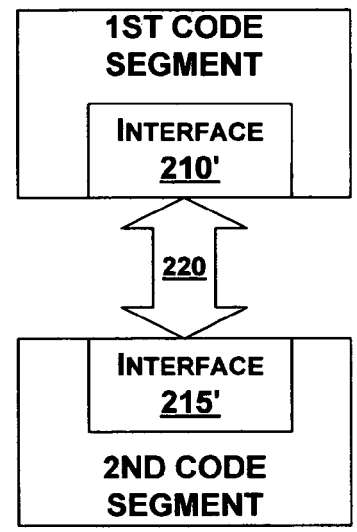

In some cases, it may be possible to ignore, add, or redefine certain aspects (e.g., parameters) of a programming interface while still accomplishing the intended result. This is illustrated in FIGS. 4A and 4B. For example, assume interface 205 of FIG. 2A includes a function call Square (input, precision, output), that includes three parameters, input, precision and output, and which is issued from the $1^{st}$ Code Segment to the $2^{nd}$ Code Segment. If the middle parameter precision is of no concern in a given scenario, as shown in FIG. 4A, it could just as well be ignored or even replaced with a meaningless (in this situation) parameter. An additional parameter of no concern may also be added. In either event, the functionality of square can be achieved, so long as output is returned after input is squared by the second code segment.

Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 4B, interface 210 is replaced by interface 210', redefined to ignore or add parameters to the interface. Interface 215 may similarly be redefined as interface 215', redefined to ignore unnecessary parameters, or parameters that may be processed elsewhere. As can be seen, in some cases a programming interface may include aspects, such as parameters, that are not needed for some purpose, and so they may be ignored or redefined, or processed elsewhere for other purposes.

C. Inline Coding

Figure 5A:
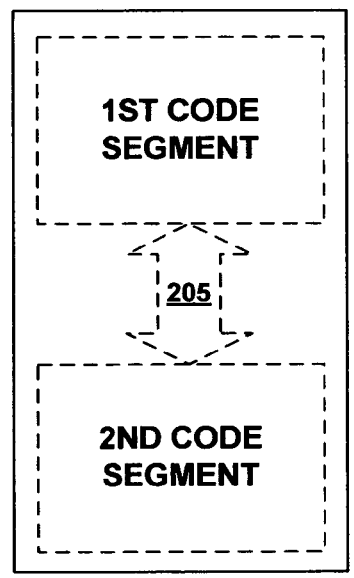
Figure 5B:
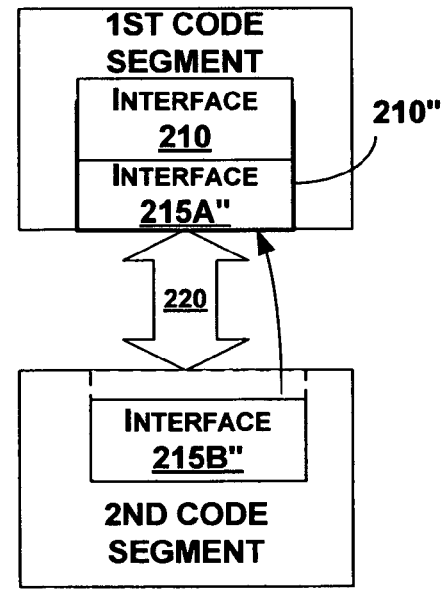

It may also be feasible to merge some or all of the functionality of two separate code modules such that the "interface" between them changes form. For example, the functionality of FIGS. 2A and 2B may be converted to the functionality of FIGS. 5A and 5B, respectively. In FIG. 5A, the previous 1$^{st}$ and 2$^{nd}$ Code Segments of FIG. 2A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface 205 may still be in effect. Similarly, shown in FIG. 5B, part (or all) of interface 215 from FIG. 2B may be written inline into interface 210 to form interface 210". As illustrated, interface 215 is divided into 215A" and 215B", and interface portion 215A" has been coded in-line with interface 210 to form interface 210".

For a concrete example, consider that the interface 210 from FIG. 2B may perform a function call square (input, output), which is received by interface 215, which after processing the value passed with input (to square it) by the second code segment, passes back the squared result with output. In such a case, the processing performed by the second code segment (squaring input) can be performed by the first code segment without a call to the interface.

D. Divorce

Figure 6A:
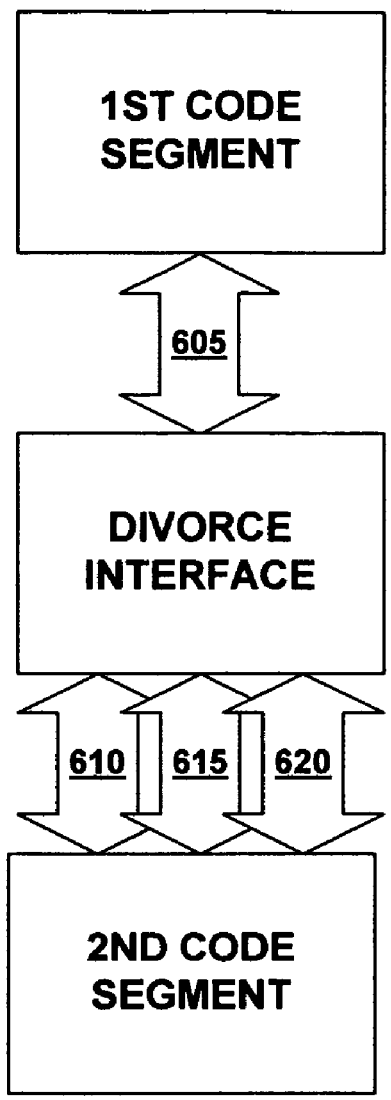

A communication from one code segment to another may be accomplished indirectly by breaking the communication into multiple discrete communications. This is depicted schematically in FIGS. 6A and 6B. As shown in FIG. 6A, one or more piece(s) of middleware (Divorce Interface(s), since they divorce functionality and/or interface functions from the original interface) are provided to convert the communications on the first interface 605, to conform them to a different interface, in this case interfaces 610, 615, and 620. This might be done, for example, where there is an installed base of applications designed to communicate with, say, an operating system in accordance with an the first interface 605's protocol, but then the operating system is changed to use a different interface, in this case interfaces 610, 615, and 620. It can be seen that the original interface used by the 2$^{nd}$ Code Segment is changed such that it is no longer compatible with the interface used by the 1$^{st}$ Code Segment, and so an intermediary is used to make the old and new interfaces compatible.

Figure 6B:
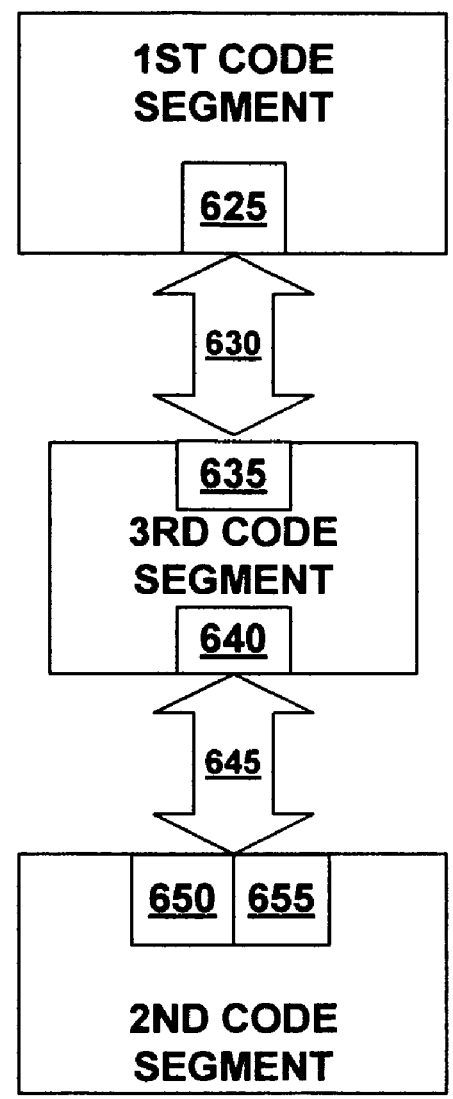

Similarly, as shown in FIG. 6B, a third code segment can be introduced with divorce interface 635 to receive the communications from interface 630 and with divorce interface 640 to transmit the interface functionality to, for example, interfaces 650 and 655, redesigned to work with 640, but to provide the same functional result. Similarly, 635 and 640 may work together to translate the functionality of interfaces 210 and 215 of FIG. 2B to a new operating system, while providing the same or similar functional result.

E. Rewriting

Yet another possible variant is to dynamically rewrite the code to replace the interface functionality with something else but which achieves the same overall result. For example, there may be a system in which a code segment presented in an intermediate language (e.g. Microsoft IL, Java® Byte-Code, etc.) is provided to a Just-in-Time (JIT) compiler or interpreter in an execution environment (such as that provided by the .Net framework, the Java® runtime environment, or other similar runtime type environments). The JIT compiler may be written so as to dynamically convert the communications from the 1$^{st}$ Code Segment to the 2$^{nd}$ Code Segment, i.e., to conform them to a different interface as may be required by the 2$^{nd}$ Code Segment (either the original or a different 2$^{nd}$ Code Segment). This is depicted in FIGS. 7 and 8.

Figure 7:
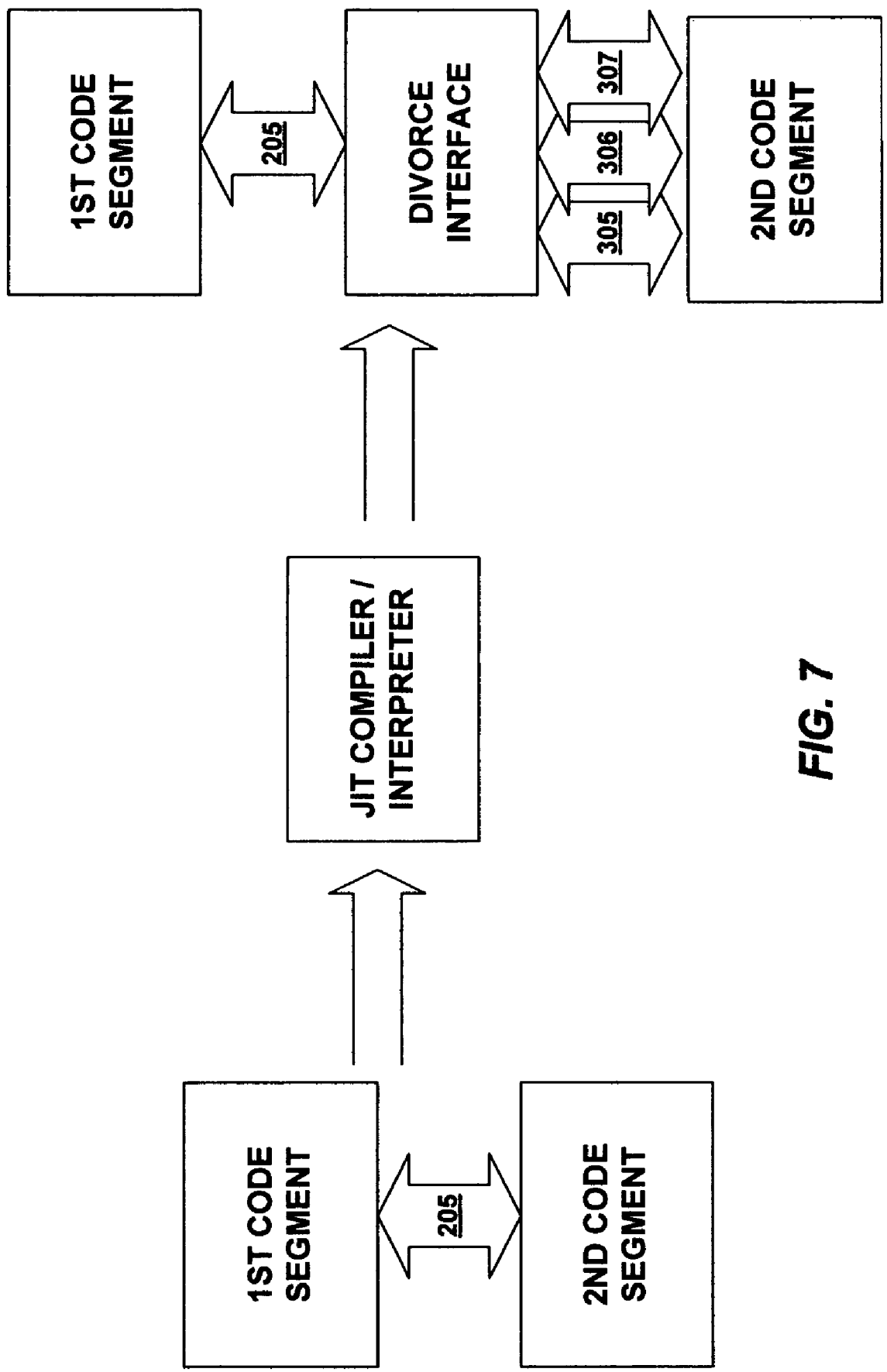
FIGS. 7 and 8 are block diagrams that generally represent how a compiler or interpreter may transform one or more interfaces to one or more other interfaces in accordance with aspects of the subject matter described herein.
Figure 8:
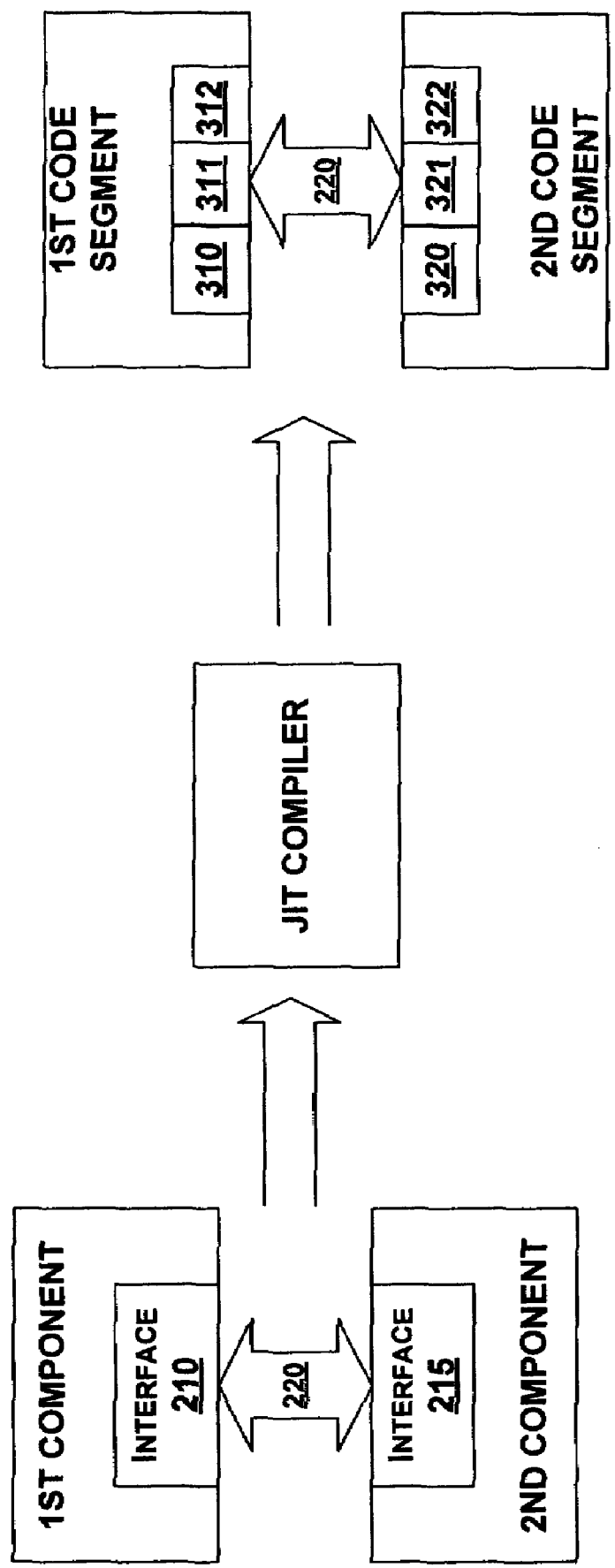

As can be seen in FIG. 7, this approach is similar to the Divorce scenario described above. It might be done, for example, where an installed base of applications are designed to communicate with an operating system in accordance with a first interface protocol, but then the operating system is changed to use a different interface. The JIT Compiler may be used to conform the communications on the fly from the installed-base applications to the new interface of the operating system. As depicted in FIG. 8, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched, and combined to produce the same or equivalent scenarios to the generic scenarios presented in FIGS. 2A and 2B. It is also noted that, as with most programming constructs, there are other similar ways of achieving the same or similar functionality of an interface which may not be described herein, but nonetheless are represented by the spirit and scope of the subject matter described herein, i.e., it is noted that it is at least partly the functionality represented by, and the advantageous results enabled by, an interface that underlie the value of an interface.

Image Resource

Figure 9A:
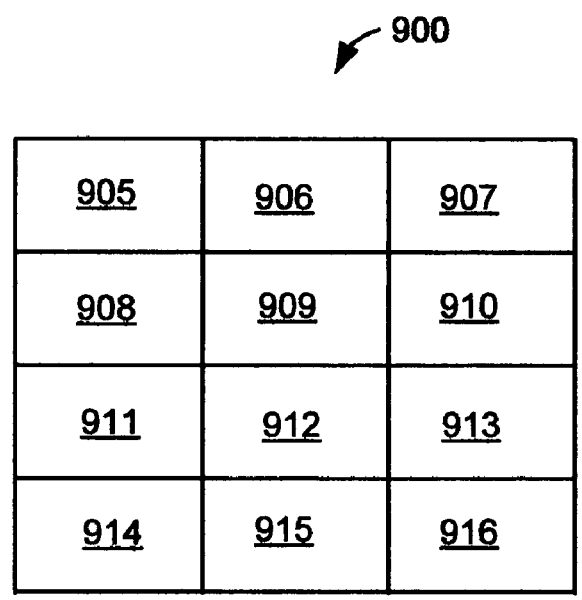
FIG. 9A is a diagram representing a grid that may be displayed in accordance with aspects of the subject matter described herein.

FIG. 9A is a diagram representing a grid that may be displayed in accordance with aspects of the subject matter described herein. The grid 900 may be displayed in conjunction with other elements (sometimes referred to as "controls") such as buttons, drop down list boxes, pictures, text, and the like (not shown), for example.

A graphics framework may be used to display the grid 900 and images displayed within the cells 905-916 of the grid 900. The graphics framework may use a visual tree such as the one represented in FIG. 9B, which is a block diagram generally representing a visual tree in accordance with aspects of the subject matter described herein. The visual tree may include visual elements 920, 925, 930, 935, 940, 945, 950, 955, 960, and 965 which represent elements to display. Such elements may include grids, list boxes, combo boxes, buttons, text, graphics, and the like. Some elements in the visual tree may include other elements in the visual tree. For example, a button element may include a text element and a rectangle element. To render an element, all of the element's descendants need to be rendered.

Turning back to FIG. 9A, a software developer may desire to display images within some of the cells 905-916. One approach to displaying such images is to store them as bitmaps and to call routines that display the bitmaps at the appropriate locations. Provided that a bitmap and the cell into which it is drawn have the same number of pixels in the appropriate dimensions, this approach works well. When the bitmap is smaller than the cell, pixelation may occur when resizing the bitmap to fit the cell. Alternatively, if the bitmap is not resized, it may fill a very small portion of the cell depending on how much bigger the cell is than the bitmap.

To deal with this problem, images may be drawn using drawing commands (sometimes referred to as vector graphics). Each drawing command may indicate, for example, a direction and distance to draw a line, a center point, radius, and arc length, a path, ellipse geometry, character definitions, or some other geometric means for drawing the image. Such images may be expanded or shrunk without becoming pixelated by scaling the distances involved in each drawing command by a scaling factor and changing coordinates, if needed, for example. Drawing commands may be stored in metafiles.

Some images are difficult to resize while retaining fidelity to the original image. Such images include bitmaps which may be represented by JPG, GIF, and other bitmap-oriented schemes, video images, and so forth. In the future, more images may be represented by drawing commands or their equivalent to allow better scaling of such images. Below is presented a resolution independent mechanism for maintaining compatibility with bitmap-type images while taking advantage of easily-scalable types of images.

Figure 10:
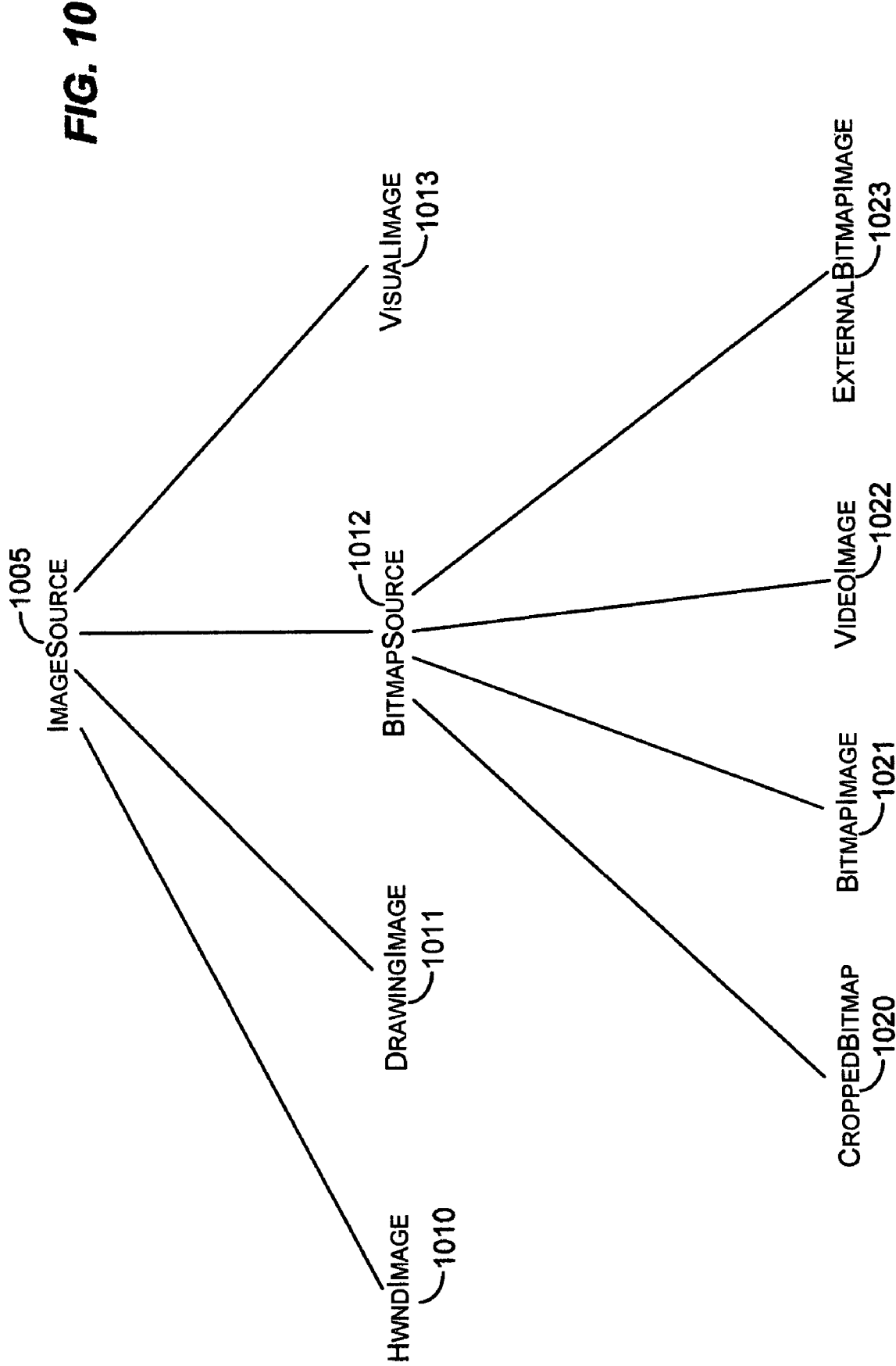
FIG. 10 is a diagram representing a class hierarchy in accordance with aspects of the subject matter described herein.

FIG. 10 is a diagram representing a class hierarchy in accordance with aspects of the subject matter described herein. The class hierarchy may include class ImageSource 1005, class HwndImage 1010, class DrawingImage 1011, class BitmapSource 1012, class VisualImage 1013, class CroppedBitmap 1020, class BitmapImage 1021, class VideoImage 1022, and class ExternalBitmapImage 1023.

The class ImageSource 1005 may comprise an abstract class and may be the parent of classes 1010-1013. The class BitmapSource 1012 may be the parent of classes 1020-1023. It will be understood that the arrangement of the classes in the hierarchy may be changed and that more, fewer, or other subclasses may be included without departing from aspects of the subject matter described herein.

It will also be understood that with object-oriented languages, having the class ImageSource 1005 as the parent class allows a software developer to declare a variable with the type of ImageSource and then to assign this variable to an object derived from any of the descendant classes of the class ImageSource 1005.

One exemplary interface for the class ImageSource 1005 is comprised as follows:

```
public abstract class ImageSource
{
    public virtual Rect AreaOfInterest { get; set; }
    public virtual BrushMappingMode AreaOfInterestUnits { get; set; }
    public abstract double Height { get; }
    public abstract double Width { get; }
}
```

Height and Width may represent physical dimensions (e.g., millimeters, inches, or some other unit of measure) as opposed to pixel dimensions. By defining Height and Width in physical dimensions, the resolution may be variable. The properties AreaOfInterest and AreaOfInterestUnits may specify which portion of the image is to be used when displaying the image. The BrushMappingMode may indicate whether the AreaOfInterest is given in relative coordinates or in absolute coordinates.

In some embodiments, the interface for the class ImageSource may be comprised as follows:

```
public abstract class ImageSource
{
    public abstract double Height { get; }
    public abstract double Width { get; }
}
```

In such embodiments, the entire image associated with an ImageSource object (i.e., an object instantiated in accordance with a definition of a descendant of the ImageSource class 1005) may be displayed as compared to a portion defined by AreaOfInterest.

In addition to its public interface, the ImageSource class descendants may also implement non-public methods such as a drawing method that may be used to produce a visual rasterization of the image associated with an ImageSource object. This drawing method may be used to draw the image in a particular region of the display.

Similarly, in some implementations, the public interfaces for the classes 1010-1023 may be defined as:

```
public class HwndImage : ImageSource
{
    public HwndImage( );
    public HwndImage(HWND hwnd);
    public HWND { get; set; }
}
public class DrawingImage : ImageSource
{
    /// Default DrawingImage ctor
    public DrawingImage( );
    /// DrawingImage ctor that takes a Drawing
    public DrawingImage(Drawing drawing);
    /// Drawing Property - Drawing
    public Drawing Drawing { get; set; }
}
public abstract class BitmapSource: ImageSource
{
    /// Create a BitmapSource from an array of pixels.
    public static BitmapSource Create(
        int pixelWidth,
        int pixelHeight,
        double dpiX,
        double dpiY,
        PixelFormat pixelFormat,
        BitmapPalette palette,
        System.Array pixels,
        int stride
        );
    /// Create a BitmapSource from an array of pixels in unmanaged
    /// memory.
    public static BitmapSource Create(
        int pixelWidth,
        int pixelHeight,
        double dpiX,
        double dpiY,
        PixelFormat pixelFormat,
        BitmapPalette palette,
        IntPtr buffer,
        int bufferSize,
        int stride
        );
    /// BitmapSource is abstract. Prevent construction by anybody but
    /// derived class.
    protected BitmapSource( );
    /// Horizontal DPI of the bitmap.
    public virtual double DpiX { get; }
    /// Vertical DPI of the bitmap.
    public virtual double DpiY { get; }
    /// Native format of the bitmap's data.
    /// If the BitmapSource is directly readable, this is the format
    /// the pixels will be in when they are read.
    public virtual PixelFormat Format { get; }
    /// ColorContext associated with this BitmapSource.
    public virtual ColorContext ColorContext { get; }
    /// Get the width of the bitmap in measure units (96ths of an
    /// inch).
    public override double Width { get; }
    /// Get the height of the bitmap in measure units (96ths of an
    /// inch).
    public override double Height { get; }
    /// Get the Palette for the bitmap, if there is one.
    public abstract BitmapPalette Palette { get; }
    /// Height, in pixels, of the bitmap.
    public virtual int PixelHeight { get; }
    /// Width, in pixels, of the bitmap.
    public virtual int PixelWidth { get; }
    /// Create a copy of this object.
    public new BitmapSource Copy( );
    /// Copy a rect of pixel data from the bitmap into the array of
```

```
        /// pixels that has the specified stride, starting at the offset
        /// (specified in number of pixels from the beginning). An empty
        /// rect (one with a width and/or height of 0), means to ignore
        /// the rect and copy the entire bitmap.
        public virtual void CopyPixels(
            IntegerRect sourceRect,
            Array pixels,
            int stride,
            int offset
            );
        /// Copy the pixel data from the bitmap into the array of pixels
        /// that has the specified stride, starting at the offset
        /// (specified in number of pixels from the beginning).
        public virtual void CopyPixels(
            Array pixels,
            int stride,
            int offset
            );
        /// Copy the pixel data from the bitmap into the array of pixels
        /// in unmanaged memory that has the specified stride.
        /// Marked as unsafe
        public unsafe virtual void CopyPixels(
            IntegerRect sourceRect,
            IntPtr buffer,
            int bufferSize,
            int stride
            );
    }
    /// CroppedBitmap crops a Bitmap region
    public sealed class CroppedBitmap : BitmapSource, ISupportInitialize
    {
        public CroppedBitmap( );
        /// Source of the Bitmap to crop
        public BitmapSource Source { get; set; }
        /// Area to crop
        public IntegerRect SourceRect { get; set; }
    }
    public BitmapImage : BitmapSource, ISupportInitialize
    {
        /// ctor takes no params.
        public BitmapImage( );
        /// ctor to create BitmapImage using a Uri
        public BitmapImage(Uri uri);
        /// Set the source for the bitmap.
        /// In the case where both UriSource and StreamSource properties
        /// are set, the StreamSource is ignored.
        public Uri UriSource { get; set; }
        /// Set the source for the bitmap.
        public Stream StreamUri { get; set; }
        /// Set the width to decode the image to. If DecodeHeight is not
        /// set, then keep the aspect ratio the same. Otherwise, ignore
        /// aspect ratio.
        public int DecodePixelWidth { get; set; }
        /// Set the height to decode the image to. If DecodeWidth is
        /// also set,then keep the aspect ratio the same. Otherwise,
        /// ignore the aspect ratio.
        public int DecodePixelHeight { get; set; }
        /// The angle (90, 180, 270) to rotate the image to.
        public Rotation Rotation { get; set; }
        /// The rect of interest to get from the decoder for this bitmap.
        public IntegerRect SourceRect { get; set; }
        /// Accesses the create options for this image
        public CreateOptions CreateOptions { get; set; }
        /// Accesses the cache option for this image
        public CacheOption CacheOption { get; set; }
    }
        public class VideoImage : BitmapSource
    {
        public VideoImage( );
        public VideoImage(MediaTimeline mediaTimeline);
        public MediaTimeline {get; set;}
    }
    public class ExternalBitmapImage : BitmapSource
    {
        public ExternalBitmapImage( );
        public ExternalBitmapSource{get; set;}
    }
    public class VisualImage : ImageSource
    {
        public VisualImage( );
        public VisualImage(Visual visual);
        public Visual {get; set;}
    )
```

The implementations above are exemplary and may be changed without departing from the spirit or scope of the subject matter described herein.

The class HWndImage 1010 allows a software developer to treat a window as an image source. As the content displayed in the window changes, the image displayed by an HWndImage object may also change to reflect what is displayed in the window. This may be useful in a windows manager, for example, to switch between applications. Instead of displaying an icon representing a particular application, live contents included in a window of the application may be displayed.

The class DrawingImage 1011 allows a software developer to treat an image created by drawing commands (e.g., vector graphics) as an image source.

The class BitmapSource 1012 allows a software developer to treat bitmaps as an image source. A bitmap source object may create a bitmap on demand but may or may not store the bits internally with which to create the bitmap. For example, a bitmap source object may use a file or stream or use an object from which a bitmap may be created to create a bitmap. For example, a bitmap source object may reference a JPG file. A JPG file does not store a bitmap but rather stores a compressed representation that may be used to generate a bitmap.

The CroppedBitmap class 1020 may be used to create a cropped bitmap object which may be used to treat a cropped bitmap as an ImageSource. Note that an object instantiated in accordance with the CroppedBitmap class 1020 may or may not store a copy of a bitmap. In some embodiment, the CroppedBitmap object may store a reference to another BitmapSource object. When the CroppedBitmap object is asked to render itself, it may work in conjunction with the other BitmapSource object to render the image associated with the CroppedBitmap object. In other embodiments, the CroppedBitmap object may store a copy of a bitmap instead of, or in addition to, storing a reference to another object. This feature of storing a reference to another ImageSource object and using the other ImageSource object to render an image may also be used by other ImageSource classes without departing from the spirit or scope of the subject matter described herein.

The BitmapImage class 1021 may be used to create a bitmap object which may be used to treat a standard bitmap as an ImageSource.

The VideoImage class 1022 may be used to treat a video as an ImageSource. A video may include one or more frames that may be accessed as bitmaps.

The ExternalBitmapImage class 1023 may be used to treat a program that periodically generates new bitmaps as an ImageSource. For example, presentation software may show frames of a slideshow on a periodic basis. Game software may provide frames related to a game. Such software may provide an indication as to when a new frame is available.

Figure 9B:
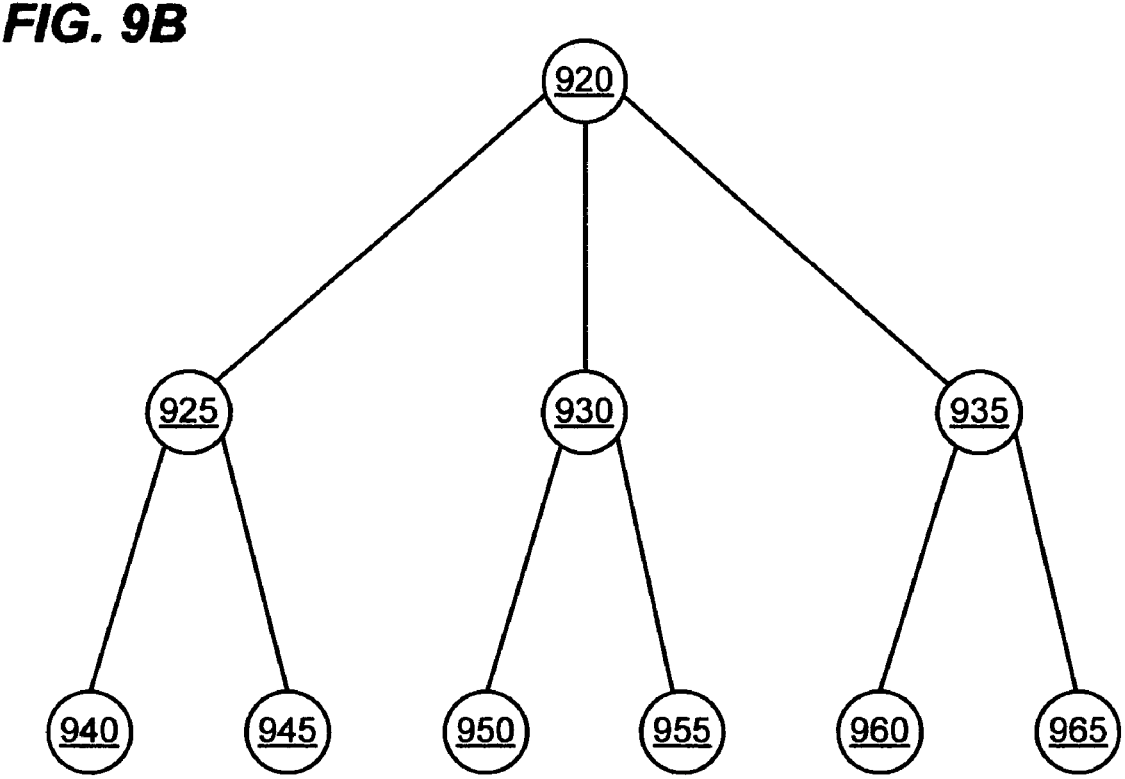
FIG. 9B is a block diagram generally representing a visual tree in accordance with aspects of the subject matter described herein.

A VisualImage is an image that is made up of user interface (UI) elements. For example, a VisualImage may comprise a dialog box with buttons, combo boxes, tree view controls, and/or other UI elements. The class VisualImage 1013 allows a software developer to treat a visual image as an ImageSource. Referring to FIG. 9B, a VisualImage may be one of the elements 920-965 of the visual tree. Each time an element changes which is associated with a VisualImage object, the VisualImage object may be notified of the change so that it may re-render its associated image.

Allowing a VisualImage to be treated as an ImageSource allows a software developer to create interesting visual effects. For example, software may display a VisualImage of a reflection of a button so that it appears that the button is resting on a plane of glass or pool of water. This may be done by instantiating a VisualImage object and pointing it to the actual button and then creating a routine the fades the Image-Source (since VisualImage is an ImageSource) and flips it upside down to create a reflection of the button. When the button is pressed and its image changes, notification may be sent to the VisualImage object so that the VisualImage object may change the reflection of the button to also appear as being pressed so as to reflect the appearance of the button.

ImageSource objects may be used by a variety of programs. For example, in a user interface platform, an image control may have a property which is of type ImageSource class 1005. This allows the image control to reference and use an ImageSource object in manipulating or displaying the image. For example, if the image control is called Image and the property of the image control is called Source, then, the Source property may be set to an ImageSource object by any of the following exemplary instructions:

Image.Source=new DrawingImage (Reference to drawing image)

Image.Source=new HWndImage (Reference to windows handle)

Image.Source=new BitmapImage (Reference to bitmap image)

Image.Source=new VisualImage (Reference to visual image)

The list above is not intended to be all-inclusive and other ways of setting the Source property to an ImageSource object may be used without departing from the spirit or scope of the subject matter described herein.

Another component that may use an ImageSource object is an ImageBrush component. An ImageBrush component may use an ImageSource object to fill a shape with the image associated with the ImageSource object. For example, by using an ImageSource object, the ImageBrush component may repeat the image as many times as need to fill the shape, flip the image as it repeats, center it in the shape, or perform any number of manipulations to fill the shape with the image.

A pen component may use a brush component to fill the line drawn by the pen. Thus, the pen component may also indirectly (e.g., via a brush component) use an ImageSource object to draw lines. Similarly, text may use an image brush component to fill the text with an ImageSource object.

Another component that may use an ImageSource object is an image drawing component. A drawing may comprise a group of objects that are to be manipulated or displayed together. Through an ImageSource object, an ImageDrawing may treat the image associated with the ImageSource object as a drawing.

More, fewer, or other components may use an Image-Source object without departing from the spirit or scope of the subject matter described herein.

Figure 11:
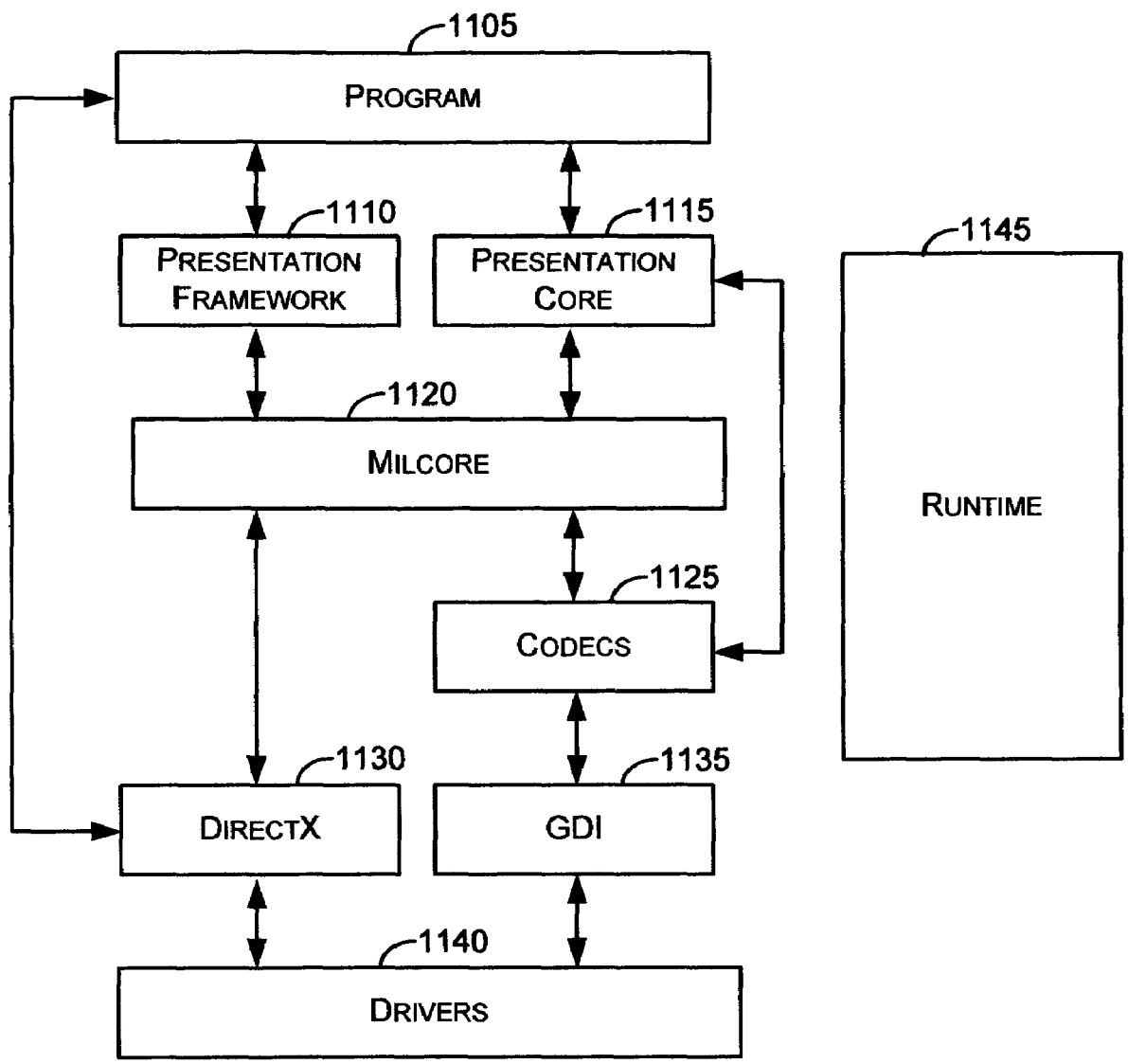
FIG. 11 is a block diagram that generally represents an environment in which aspects of the subject matter described herein may operate.

FIG. 11 is a block diagram that generally represents an environment in which aspects of the subject matter described herein may operate. The environment may include a program 1105, a presentation framework 1110, a presentation core 1115, a milcore 1120, a runtime component 1145, a codecs component 1125, a DirectX component 1130, a graphics device interface (GDI) 1135, and drivers 1140.

The presentation framework 1110 is exposed to software developers and includes APIs by which various requests may be made. Top level objects of a graphics framework (e.g., the graphics framework described in conjunction with FIG. 9), such as the image control described previously, buttons, list boxes, combo boxes, scroll bars, splitters, and the like, may reside in the presentation framework 1110.

The presentation core 1115 is also exposed to software developers through APIs by which various requests may be made. Interfaces described previously may be exposed through the presentation core 1115. The properties of a top level object of a graphics framework, such as an ImageSource object, brushes, pens, shapes, animation support, text, and the like, may reside in the presentation core 1115 or the presentation framework 1110.

The milcore 1120 implements functionality provided by the APIs of the presentation framework 1110 and the presentation core 1115. The milcore 1120 may be accessed by the presentation core 1115 and the presentation framework 1110.

The runtime component 1145 may provide an environment for running intermediate language created from one or more programming languages. For example, the runtime component may be used to execute intermediate language created from code that implements the presentation core 1115, the presentation framework 1110, and the program 1105.

The codecs 1125 may be used by the presentation core 1115 and the milcore 1120 for imaging tasks such as encoding and decoding images.

The DirectX component 1130 may provide APIs to enable a software developer to access specialized hardware features (such as video and sound hardware features) without having to write hardware-specific code. The program 1105 and milcore 1120 may use the DirectX component 1130 to access the features.

The GDI 1135 allows processes to display graphics and formatted text on a video display and may interact with device drivers that display graphics and formatted text on behalf of such processes.

Although some lines have been drawn between various components of the environment of FIG. 11 to represent the capacity to communicate between these components, more, fewer, or other communication paths may exist without departing from the spirit or scope of the subject matter described herein. Furthermore, while various components of the environment have been described, it will be recognized that more, fewer, or other components may be used or configured in other configurations without departing from the spirit or scope of the subject matter described herein.

Figure 12:
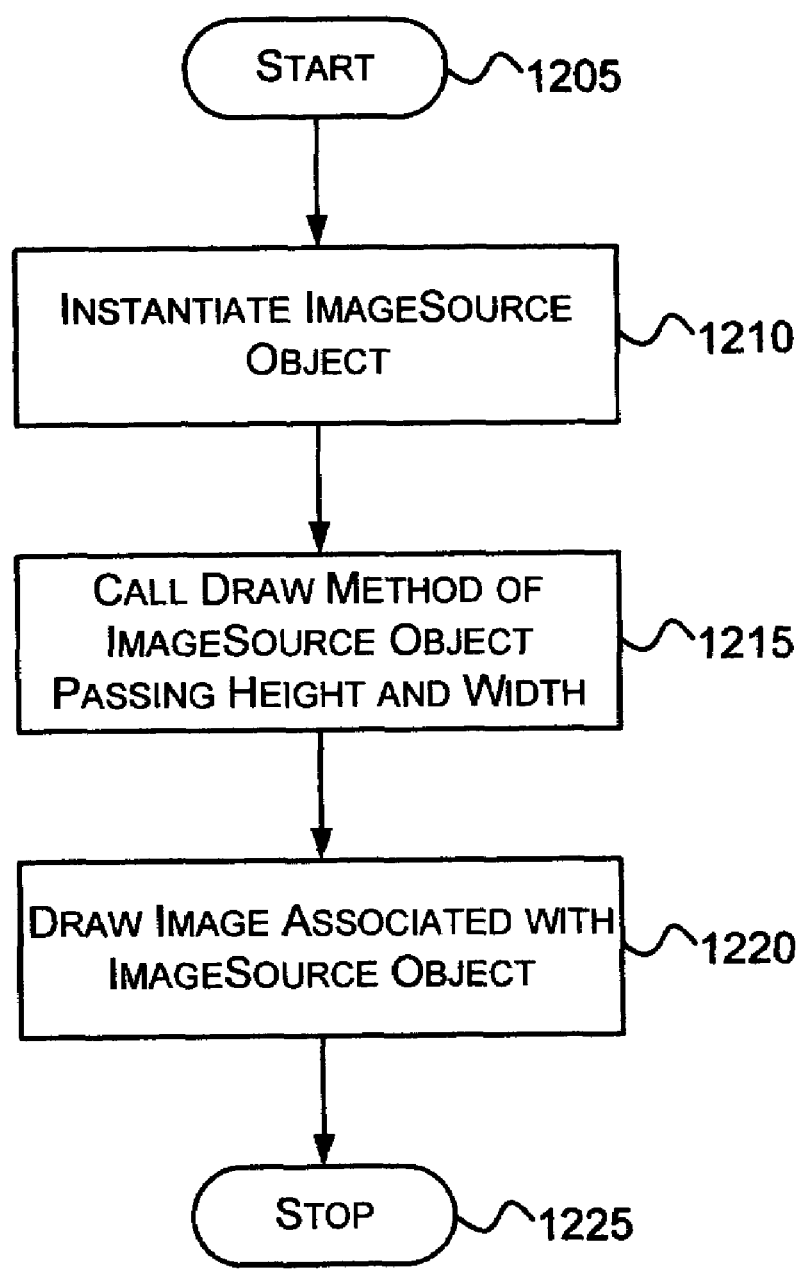
FIG. 12 is a flow diagram that generally represents actions that may occur in accordance with aspects of the subject matter described herein.

FIG. 12 is a flow diagram that generally represents actions that may occur in accordance with aspects of the subject matter described herein. At block 1205, the actions start.

At block 1210, an ImageSource object is instantiated. This may be done by calling new and providing the name of an ImageSource class (i.e., any of the descendant classes in the class hierarchy described in conjunction with FIG. 10) as described previously.

At block 1215, the draw method of the ImageSource object is called. This method may be called with a height and width. Area of interest and brush mapping style may also be passed in this call as previously indicated.

At block 1220, in response to the call to the draw method, the ImageSource object may rasterize an image associated with the ImageSource object.

At block 1225 the actions stop. The actions above or a portion thereof may be repeated each time it is desired to have an image associated with the ImageSource object rasterized.

Aspects of the subject matter described herein allow a software developer ability to provide different representations for objects that can be displayed in a defined region as images. A software developer, for example, may provide an image in any format supported by an ImageSource object.

Furthermore, aspects of the subject matter described herein allow sending ImageSource objects to other components without those other components knowing how the image is made or rendered. For example, as described previously, an ImageSource object may be provided to an image brush which fills the geometry with an image. The image brush does not need to know whether the image associated with the ImageSource object is a video clip, a metafile, or a visual image (i.e., an image that is made up of other UI elements in a scene) and may simply cause the image to be rendered at a desired location by calling a drawing method associated with the ImageSource object.

As can be seen from the foregoing detailed description, aspects have been described related to images. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. At least one computer storage medium having stored computer-executable instructions which, when executed by a processor of a computer system that includes memory and a display device, implement a method for operating on an image with a programming interface that includes a class hierarchy of operations for operating on images, the method comprising:

receiving at the programming interface that is loaded into the memory a height parameter and a width parameter that indicate a height and width with which to display the image, wherein the height and width are parameters of an object that is of type ImageSource, the object being stored in the memory, the object also including a source parameter which represents the source of the image, wherein ImageSource is an abstract parent class of the programming interface, the programming interface being defined according to a class hierarchy defining operations for operating on images associated with bitmaps and images associated with vector graphics, the images being stored in the memory, the class hierarchy further including a plurality of children classes that are children of the ImageSource class, the children classes including a HwndImage class which enables a window to be treated as a source of the image, a DrawingImage class which enables a drawing created by drawing commands to be treated as the source of the image, a BitmapSource class which enables a bitmap to be treated as the source of the image, and a VisualImage class which enables a video image to be treated as the source of the image, such that the source parameter of the object may represent a source of the image having a type of any one of the children classes such that the object need not know the type of the source of the image to display the image; and in response to receiving the height and width parameters, displaying, on the display device, the image in an area corresponding to the height and width parameters using a function that is defined by the child class to which the source of the image corresponds such that the image is displayed without the object knowing the type of the source of the image.

2. The at least one computer storage medium of claim 1, further comprising receiving at the interface an area of interest parameter that indicates area within the image and a mapping mode that indicates whether the area of interest parameter is given in relative or absolute coordinates.

3. The at least one computer storage medium of claim 1, wherein the height and width parameters are specified in physical dimensions.

4. The at least one computer storage medium of claim 1, wherein additional height and width parameters specify pixel dimensions when the image comprises a bitmap.

5. The at least one computer storage medium of claim 1, wherein the class hierarchy further defines operations for operating with an image of a window of a program to display content that is currently in the window.

6. The at least one computer storage medium of claim 1, wherein the class hierarchy further defines operations for operating on a video image.

7. The at least one computer storage medium of claim 1, wherein the class hierarchy further defines operations for operating on a bitmap image created by a program that periodically generates new bitmap images.

8. The at least one computer storage medium of claim 1, wherein the class hierarchy further defines operations for obtaining images from controls managed by a graphics framework and creating derivative images therefrom.

9. The at least one computer storage medium of claim 1, wherein the class hierarchy further includes descendent classes, which descend from the BitmapSource class, including a CroppedBitmap class, a BitmapImage class, a VideoImage class, and an ExternalBitmapImage class.

10. In a computing system that includes memory and a display device, a method for operating on an image associated with an object that is defined according to classes of a class hierarchy, comprising:

receiving at a programming interface that is loaded into the memory a height parameter and a width parameter that indicate a height and width with which to display the image, wherein the height and width are parameters of the object that is of type ImageSource, the object being stored in the memory, the object also including a source parameter which represents the source of the image, wherein ImageSource is an abstract parent class of the programming interface, the programming interface being defined according to a class hierarchy defining operations for operating on images associated with bitmaps and images associated with vector graphics, the images being stored in the memory, the class hierarchy further including a plurality of children classes that are children of the ImageSource class, the children classes including a HwndImage class which enables a window to be treated as a source of the image, a DrawingImage class which enables a drawing created by drawing commands to be treated as the source of the image, a BitmapSource class which enables a bitmap to be treated as the source of the image, and a VisualImage class which enables a video image to be treated as the source of the image, such that the source parameter of the object may represent a source of the image having a type of any of the children classes such that the object need not know the type of the source of the image to display the image; and in response to receiving the height and width parameters, displaying, on the display device, the image in an area corresponding to the height and width parameters using a function that is defined by the child class to which the source of the image corresponds such that the image is displayed without the object knowing the type of the source of the image.

11. The method of claim 10, wherein the object corresponds to a property of a control, wherein the control is unaware of the type of the source of the image.

12. The method of claim 11, wherein the control comprises a drawing brush and further comprising filling a region with the image via the drawing brush.

13. The method of claim 10, wherein the bitmaps and vector graphics are associated with a control and wherein the image associated with the object is derived by an operation on an image associated with the control.

14. The method of claim 13, wherein the image associated with the object is updated in response to the image associated with the control being updated.

15. The method of claim 10, wherein the height and width are specified in units other than pixels.

16. The method recited in claim 10, wherein the class HWndImage causes the image to be displayed that reflects what is displayed in the window and such that as content of the window changes, so does the image.

17. In a computing system that includes memory and a display device, a graphics framework system for operating on an image associated with an object instantiated in accordance with a class hierarchy comprising:

a processor;

a display device; and memory storing computer-executable instructions which when executed by the processor perform a method comprising:

receiving at a programming interface that is loaded into the memory a height parameter and a width parameter that indicate a height and width with which to display the image, wherein the height and width are parameters of the object that is of type ImageSource, the object being stored in the memory, the object also including a source parameter which represents the source of the image, wherein ImageSource is an abstract parent class of the programming interface, the programming interface being defined according to a class hierarchy defining operations for operating on images associated with bitmaps and images associated with vector graphics, the images being stored in the memory, the class hierarchy further including a plurality of children classes that are children of the ImageSource class, the children classes including a HwndImage class which enables a window to be treated as a source of the image, a DrawingImage class which enables a drawing created by drawing commands to be treated as the source of the image, a BitmapSource class which enables a bitmap to be treated as the source of the image, and a VisualImage class which enables a video image to be treated as the source of the image, such that the source parameter of the object may represent a source of the image having a type of any of the children classes such that the object need not know the type of the source of the image to display the image; and in response to receiving the height and width parameters, displaying, on the display device, the image in an area corresponding to the height and width parameters using a function that is defined by the child class to which the source of the image corresponds such that the image is displayed without the object knowing the type of the source of the image.

18. The graphics framework system of claim 17, wherein the class hierarchy provides a definition of a class that treats a cropped bitmap as the source of the image.

19. The graphics framework system of claim 18, wherein a first object instantiated in accordance with the class includes a reference to a second object instantiated in accordance with a class of the class hierarchy, and wherein the first object works in conjunction with the second object to render the cropped bitmap.

20. The graphics framework system of claim 17, wherein the class hierarchy provides a definition of a class that treats a video image as the source of the image.

* * * * *